US012198072B2

(12) United States Patent
Yan et al.

(10) Patent No.: US 12,198,072 B2
(45) Date of Patent: *Jan. 14, 2025

(54) PREDICTING CUSTOMER LIFETIME VALUE WITH UNIFIED CUSTOMER DATA

(71) Applicant: AMPERITY, INC., Seattle, WA (US)

(72) Inventors: Yan Yan, Seattle, WA (US); Aria Haghighi, Seattle, WA (US); Nicholas Resnick, Seattle, WA (US); Andrew Lim, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,803

(22) Filed: Dec. 20, 2023

(65) Prior Publication Data
US 2024/0152782 A1 May 9, 2024

Related U.S. Application Data

(63) Continuation of application No. 16/938,591, filed on Jul. 24, 2020, now Pat. No. 11,893,507.

(51) Int. Cl.
G06N 5/04 (2023.01)
G06F 16/23 (2019.01)
G06F 16/24 (2019.01)
G06N 20/00 (2019.01)
G06Q 30/0201 (2023.01)
G06Q 30/01 (2023.01)
G06Q 30/0202 (2023.01)

(52) U.S. Cl.
CPC ........... *G06N 5/04* (2013.01); *G06F 16/2379* (2019.01); *G06F 16/24* (2019.01); *G06N 20/00* (2019.01); *G06Q 30/0201* (2013.01); G06Q 30/01 (2013.01); G06Q 30/0202 (2013.01)

(58) Field of Classification Search
CPC ...... G06N 20/00; G06N 5/04; G06F 16/2379; G06F 16/24; G06Q 30/0201; G06Q 30/0202; G06Q 30/01
See application file for complete search history.

(56) References Cited

U.S. PATENT DOCUMENTS 6,366,943 B1 * 4/2002 Clinton .................. G06F 7/507
708/551
7,092,863 B2 * 8/2006 Goldman ............... G05B 17/02
703/2

(Continued)

OTHER PUBLICATIONS

Berger, Elsevier, 2015, pp. 90-105.*

Primary Examiner — Michael I Ezewoko
(74) Attorney, Agent, or Firm — George David Zalepa; Greenberg Traurig, LLP

(57) ABSTRACT

Disclosed are techniques for generating features to train a predictive model to predict a customer lifetime value or churn rate. In one embodiment, a method is disclosed comprising receiving a record that includes a plurality of fields and selecting a value associated with a selected field in the plurality of fields. The method then queries a lookup table comprising a mapping of values to aggregated statistics using the value and receives an aggregated statistic based on the querying. Next, the method generates a feature vector by annotating the record with the aggregated statistic. The method uses this feature vector as an input to a predictive model.

18 Claims, 10 Drawing Sheets

(56) References Cited

U.S. PATENT DOCUMENTS

| | | | | |
|---|---|---|---|---|
| 8,214,308 B2* | 7/2012 | Chu | | G06N 5/02 |
| | | | | 706/14 |
| 9,239,990 B2* | 1/2016 | Ziskind | | G06N 20/00 |
| 9,792,405 B2* | 10/2017 | Van Rooyen | | G06F 12/0877 |
| 10,740,432 B1* | 8/2020 | Diamant | | G06N 3/045 |
| 10,762,444 B2* | 9/2020 | Fly | | G06N 7/01 |
| 10,887,727 B2* | 1/2021 | Ghatak | | H04W 4/029 |
| 11,170,064 B2* | 11/2021 | David | | H04L 51/10 |
| 11,182,666 B1* | 11/2021 | Phebus | | G06N 3/048 |
| 11,275,997 B1* | 3/2022 | Vantrease | | G06N 3/045 |
| 11,314,842 B1* | 4/2022 | Diamant | | G06N 3/045 |
| 11,334,819 B2* | 5/2022 | Feng | | G06N 20/00 |
| 11,381,445 B2* | 7/2022 | Parkvall | | H04J 11/0056 |
| 11,423,313 B1* | 8/2022 | Diamant | | G06N 3/048 |
| 11,468,472 B2* | 10/2022 | Zoldi | | G06Q 30/0269 |
| 11,537,841 B2* | 12/2022 | Wang | | G06N 3/08 |
| 11,556,762 B2* | 1/2023 | Fowers | | G06F 15/8053 |
| 11,562,235 B2* | 1/2023 | Kang | | G06N 3/04 |
| 11,580,145 B1* | 2/2023 | Kumar | | G06N 3/092 |
| 11,599,746 B2* | 3/2023 | Yang | | G06F 18/211 |
| 11,652,562 B2* | 5/2023 | Parkvall | | H04L 65/1023 |
| | | | | 370/208 |
| 11,663,490 B1* | 5/2023 | Enumula | | G06N 3/10 |
| | | | | 706/44 |
| 11,720,523 B2* | 8/2023 | Vantrease | | G06F 15/173 |
| | | | | 712/10 |
| 11,775,611 B2* | 10/2023 | Fang | | G06N 3/04 |
| | | | | 708/422 |
| 11,928,575 B2* | 3/2024 | Park | | G06N 5/025 |
| 11,941,522 B2* | 3/2024 | Zhang | | G06F 16/29 |
| 12,021,609 B2* | 6/2024 | Parkvall | | H04L 5/1469 |
| 2002/0107585 A1* | 8/2002 | Lu | | G05B 13/048 |
| | | | | 700/42 |
| 2013/0223516 A1* | 8/2013 | Goldstein | | H04N 19/12 |
| | | | | 375/240.03 |
| 2016/0093343 A1* | 3/2016 | Ovsiannikov | | G06T 1/20 |
| | | | | 365/189.04 |
| 2016/0140434 A1* | 5/2016 | Yilmaz | | G06N 3/044 |
| | | | | 706/31 |
| 2019/0080226 A1* | 3/2019 | Lee | | G06N 3/048 |
| 2019/0102673 A1* | 4/2019 | Leibovich | | G06N 3/063 |
| 2019/0236049 A1* | 8/2019 | Vantrease | | G06F 17/16 |
| 2019/0251480 A1* | 8/2019 | Garcia Duran | | G06N 20/20 |
| 2020/0050582 A1* | 2/2020 | Vantrease | | G06N 3/045 |
| 2021/0012199 A1* | 1/2021 | Zhang | | G06N 7/01 |
| 2021/0049507 A1* | 2/2021 | Feng | | H04L 67/10 |
| 2021/0157872 A1* | 5/2021 | David | | G06F 40/279 |
| 2021/0241175 A1* | 8/2021 | Harang | | G06F 18/2178 |
| 2021/0264247 A1* | 8/2021 | Kang | | G06N 3/063 |
| 2021/0334631 A1* | 10/2021 | Park | | G06N 5/025 |
| 2022/0318596 A1* | 10/2022 | Sarshogh | | G16C 20/70 |

* cited by examiner

Users 200A

| ID 202 | Name 204 | Email 206 | Address 208 | Attributes 210 |
|---|---|---|---|---|
| 1 | John Glenn | jglenn@aol.com | 123 Main St., Cambridge, OH 43752 | ... |
| 2 | Sally Ride | sally.ride@gmail.com | 700 Exposition Park Dr, Los Angeles, CA 90037 | ... |
| 3 | S. Ride | sride@ucla.edu | 3153 Purdue Ave, Los Angeles, CA 90066 | ... |
| 4 | Store Clerk | xyz@xyz.com | 123 Main St., Cambridge, OH 43752 | ... |

Orders 200B

| ID 212 | User ID 214 | Date 216 | Value 218 | Attributes 220 |
|---|---|---|---|---|
| 1 | 1 | 2020-05-01 | $125.00 | ... |
| 2 | 1 | 2020-05-03 | $75.12 | ... |
| 3 | 2 | 2020-05-07 | $896.10 | ... |
| 4 | 3 | 2020-05-09 | $6.19 | ... |
| 5 | 4 | 2020-05-16 | $75.00 | ... |
| 6 | NULL | 2020-05-21 | $210.00 | ... |

Products 200C

| ID 222 | Order ID 224 | Product ID 226 | Quantity 228 | Attributes 230 |
|---|---|---|---|---|
| 1 | 1 | 1 | 1 | ... |
| 2 | 1 | 1 | 1 | ... |
| 3 | 2 | 2 | 1 | ... |
| 4 | 3 | 3 | 1 | ... |
| 5 | 3 | 4 | 3 | ... |
| 6 | 4 | 5 | 1 | ... |
| 7 | 5 | 1 | 1 | ... |
| 8 | 6 | 6 | 1 | ... |
| 9 | 6 | 7 | 2 | ... |

FIG. 2

PREDICTING CUSTOMER LIFETIME VALUE WITH UNIFIED CUSTOMER DATA

CROSS-REFERENCE TO RELATED APPLICATIONS

This application is a continuation of and claims the benefit of U.S. application Ser. No. 16/938,591, filed Jul. 24, 2020 and incorporated by reference in its entirety.

COPYRIGHT NOTICE

A portion of the disclosure of this patent document contains material which is subject to copyright protection. The copyright owner has no objection to the facsimile reproduction by anyone of the patent document and the patent disclosure, as it appears in the Patent and Trademark Office patent files or records, but otherwise reserves all copyright rights whatsoever.

BACKGROUND

Currently, many organizations collect and store large amounts of data records in one or more databases. These data records may reflect customer information, business records, events, products, or other records. These records can accumulate from a number of data sources. For example, a retail company may sell products over different channels such as online e-commerce platforms as well as physical store locations. The retail company may maintain separate customer records for each of its different retail channels.

These organizations often seek to analyze the large amounts of data collected by users to identify trends or other insights from such data. With the proliferation of online sales channels (e.g., web and mobile), the amount of data records stored by such organizations is impossible to manually analyze. Further, the significant amount of data is usually impossible to analyze via traditional algorithms. For example, some organizations easily maintain databases that store peta- or exabytes of data. Processing such amounts by hand is practically impossible and processing such amounts of data using traditional techniques is so computationally expensive as to render the approach impossible within most organization's budget or time frames.

To remedy these problems, the use of artificial intelligence (AI) or machine learning (ML) has been implemented to generate predictive models based on a smaller subset of an organization's data. However, such approaches suffer from various deficiencies.

For example, one metric organization attempts to predict is the lifetime value of a customer (referred to as a customer lifetime value, or CLV). A CLV metric quantifies the future value of a customer to an organization. A similar, and related, metric is a churn value, which indicates how likely a customer will return to the organization and, as one example, make future purchases.

Current predictive modeling techniques for these (and other) metrics rely exclusively on historical data and, specifically, on past orders of users. These techniques unnecessarily limit the data used to make predictions and ignore the wealth of data that most organizations retain regarding customers. As a result, the models will frequently provide less than ideal, or in some cases, inaccurate, predictions.

BRIEF SUMMARY

The disclosed embodiments solve these and other problems by providing an improved feature generation process that can be used to train various logistic or linear regression models used to predict CLV and churn rates.

As a counter-example, current systems often utilize a joint Pareto/negative binomial distribution (Pareto/NBD) model to predict CLV and churn rates. A Pareto/NBD model operates exclusively on a time-series of transaction dates and total order values. As a result, this model reduces data for each customer to a few simple summary statistics, such as the time elapsed since the last transaction or the average of past transactions.

While transactional data is clearly relevant to CLV and churn rate modeling, it is far from a complete picture of a customer or how they interact with an organization. For instance, a customer being enrolled in a loyalty program or living in an area where a retail brand has strong word of mouth will impact the likelihood of that customer's retention [16], but these signals are ignored by traditional approaches such as Pareto/NBD models. In contrast to such models, modern organizations collect a wealth of information about their customers and interactions they have with a brand. One of the largest barriers to effectively utilizing this data to help drive better decision-making is the difficulty in unifying this data across business departments and channels. For this reason, there has been much interest in Customer Data Platforms (CDPs) which unify this data.

As will be described herein, the disclosed embodiments describe a modeling approach that maximizes the value from incorporating features derived from rich customer profiles that a CDP provides.

In one embodiment, a method is disclosed comprising receiving a record, the record including a plurality of fields; selecting a value associated with a selected field in the plurality of fields; querying a lookup table using the value, the lookup table comprising a mapping of values to aggregated statistics; receiving an aggregated statistic based on the querying; generating a feature vector by annotating the record with the aggregated statistic; and inputting the feature vector to a predictive model.

In another embodiment, a non-transitory computer-readable storage medium for tangibly storing computer program instructions capable of being executed by a computer processor is disclosed, the computer program instructions defining the steps of: receiving a record, the record including a plurality of fields; selecting a value associated with a selected field in the plurality of fields; querying a lookup table using the value, the lookup table comprising a mapping of values to aggregated statistics; receiving an aggregated statistic based on the querying; generating a feature vector by annotating the record with the aggregated statistic; and inputting the feature vector to a predictive model.

In another embodiment, an apparatus is disclosed comprising a processor; and a storage medium for tangibly storing thereon program logic for execution by the processor, the stored program logic causing the processor to perform the operations of: receiving a record, the record including a plurality of fields; selecting a value associated with a selected field in the plurality of fields; querying a lookup table using the value, the lookup table comprising a mapping of values to aggregated statistics; receiving an aggregated statistic based on the querying; generating a feature vector by annotating the record with the aggregated statistic; and inputting the feature vector to a predictive model.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 2 is a block diagram illustrating raw data records according to some embodiments of the disclosure.

DETAILED DESCRIPTION

Figure 1:
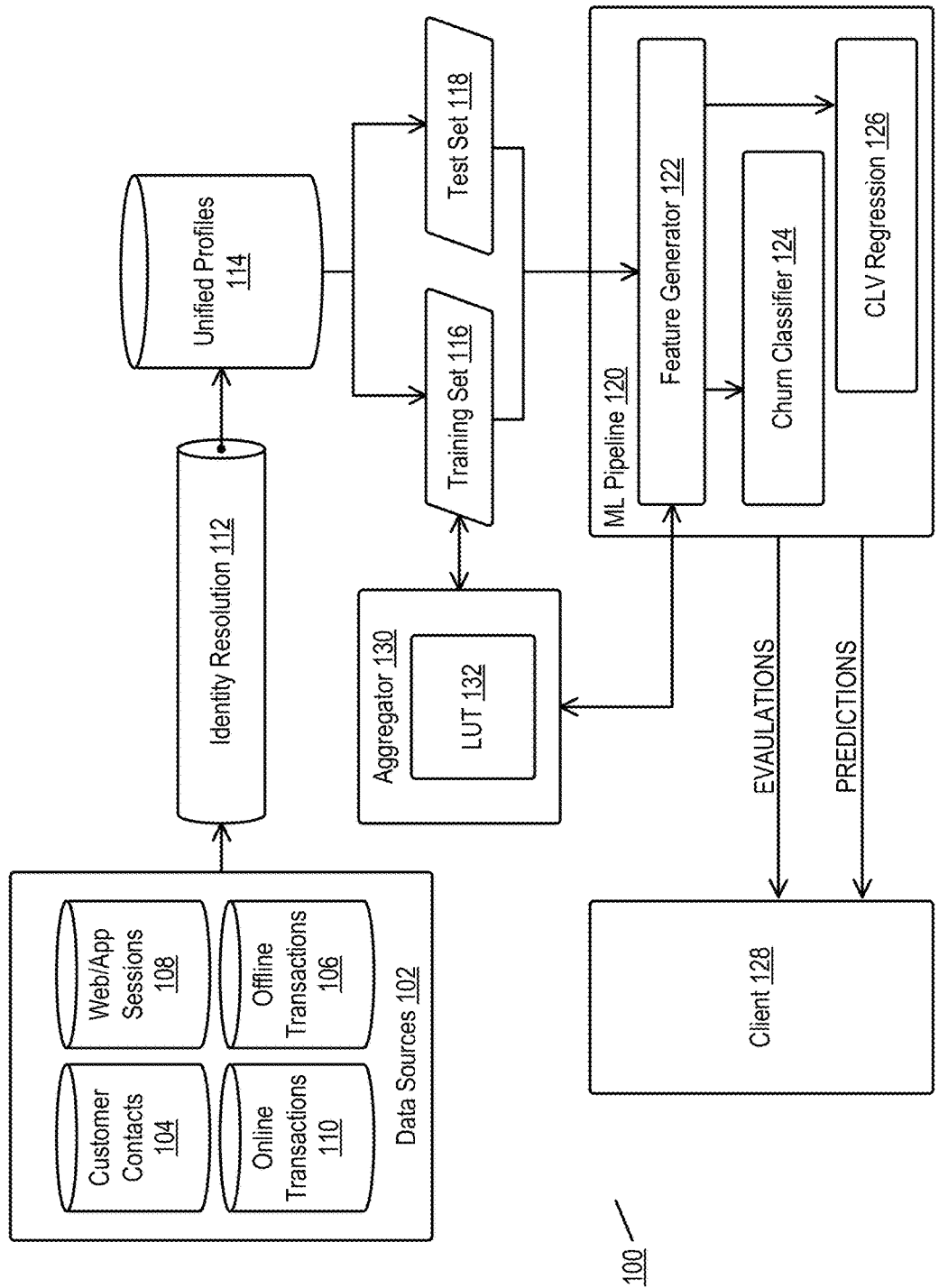
FIG. 1 is a block diagram illustrating a system for training and using models for predicting CLV and churn rates according to some embodiments of the disclosure.

FIG. 1 is a block diagram illustrating a system for training and using models for predicting CLV and churn rates according to some embodiments of the disclosure.

The illustrated system (100) includes a plurality of data sources (102) that are processed via an identity resolution pipeline (112) to generate a plurality of unified profiles (114). These profiles (114) are used as training (116) and test (118) sets of an ML pipeline (120). Clients (128) communicate with the ML pipeline (120) to obtain predictions for user records or evaluations of the ML models (122, 124). Details of the system (100) are described in more detail herein.

In the illustrated embodiment, the data sources (102) can include a plurality of data sources for a single organization or for multiple organizations. If the data sources (102) comprise data for multiple organizations, individual records may be associated with specific organizations. In the illustrated embodiment, the data sources (102) comprise raw customer data from various data sources. As illustrated, the data sources (102) may include customer contact data (104), web or mobile application session data (106), offline transactions (108), and online transactions (110). Certainly, more or fewer data sources may be used.

In the illustrated embodiment, customer contact data (104) comprises data regarding individual customers of an organization. In one embodiment, the contact data (104) may be in the form of a user profile or similar record format. For example, a given item of customer contact data (104) may include demographic data such as first name, last name, birthdate, city, state, zip code, preferred store identifier, nearest store identifier, nearest store distance, preferred product category, a flag indicating whether the user is an email subscriber, the rate at which a user opens emails, detail regarding the user's friends or family, and an identity of any loyalty accounts. The specific details regarding the fields stored in the records are not limiting. In some embodiments, organizations will have different fields. For example, a first organization may record a user's birthday while a second organization will not.

Web or mobile application session data (106) comprises data recorded via a web or mobile analytics platform. For example, an organization storing profiles for users in contact data (104) may also operate a website and/or mobile application that requires that the user login. In this scenario, the website or mobile application may be equipped with analytics software that monitors actions taken by the users in those platforms. This data is recorded in the session data store (106) and associated with a customer stored in the contact data store (104).

The data sources (102) further include an offline transaction data store (108) and an online transaction data store (110). These data stores (108, 110) may store details regarding purchases made by customers, including customers stored in the customer contact data store (104). In some scenarios, the data stored in these two data stores (108, 110) may share a similar field structure. However, online transactions are recorded via web or mobile application purchases, whereas offline transactions are recorded at point of sale terminals or similar mechanisms. In some embodiments, the transactions all include fields such as, but not limited to, an order identifier, order date, order channel, order total, product identifier, product name, product category, product quantity, etc. The specific fields are not intended to be limiting.

FIG. 2 is a block diagram illustrating raw data records according to some embodiments of the disclosure.

In the illustrated embodiment, user contact details are stored in a first table (200a). In some embodiments, this table (200a) may comprise the customer contacts store (104). As illustrated, various fields regarding users are stored, including an organizationally unique identifier (202), name (204), email (206), mailing address (208), and other attributes (210). Further, order data and product data associated with those orders are stored in tables (200b, 200c), respectively. Order data table (200b) includes fields such as an organizational unique order identifier (212), a user identifier to link orders to users (214), a data (216), a purchase amount value (218), and various other attributes (220). A product table (200c) stores data regarding products included in orders and includes fields such as a unique organizational identifier (222), an order identifier that links records to the order table (200b), a product identifier (226), a quantity value (228) and various other attributes (230).

Notably, the data depicted in FIG. 2 is provided to illustrate problems that arise with un-clustered database records that may be entered from various channels. As illustrated in the table (200a), two records with identifiers 2 and 3 likely reflect the same user ("Sally Ride"). The identity resolution pipeline (112) may detect the similarity in the "name" field ("Sally Ride" and "S. Ride") combined with both users being in Los Angeles, Calif. and combine these records into a single user. This combination will flow through the remaining tables (200b, 200c). Specifically, order identifiers 3 and 4 will be associated with a single user, and product identifiers 4 and 5 will be associated with a single user. Thus, the identity resolution pipeline (112) clusters similar records to create a canonical data source. In a similar manner, user records 1 and 4 both list the same address ("123 Main Street") but list different names and different email values. In this scenario, the identity resolution pipeline (112) may cluster these two records in a manner similar to that described above.

It should be noted that the duplicated records in the user table may arise due to users being created by different channels. Certainly, web and mobile application registrations allow users to create accounts with different demographic details. For example, the user "Sally Ride" may have both a personal ("gmail.com") account and a professional ("ucla.edu") account. However, these two accounts should be considered the same user in most scenarios. Further, some users may create new accounts due to forgotten account login details. As another example, user record 4 may have been entered by a store clerk upon a point-of-sale transaction. In this scenario, the user "John Glenn" may have provided his address to receive promotional material, and a store clerk may have entered "dummy" data in the name and email fields simply to register the address. In some embodiments, the identity resolution pipeline (112) may detect this type of error since a corresponding order (identifier 6) does not include a user identifier. In some embodiments, the date of this order may be compared to the date or time of the creation of user identifier 4 to tie the order to the errant account and ultimately back to user John Glenn due to the identical addresses.

It should be noted that the data in FIG. 2 is exemplary. As will be shown in FIGS. 3 and 4, various other types of data (i.e., differing fields and schemas) may be used in the system (100).

Returning to FIG. 1, an identity resolution pipeline (112) accesses the data stored in the data stores (102) and generates a single unified profile for each customer. The identity resolution pipeline (112) stores this unified profile in a dedicated database (114). Details of identity resolution are described more fully in commonly-owned U.S. patent Ser. Nos. 15/729,931 and 16/399,219 and U.S. Pat. No. 10,503,696 and 10,599,395 as well as commonly-owned application, the disclosures of which are not repeated herein but are incorporated by reference in their entirety. In brief, the identity resolution pipeline (112) accesses the records from the data sources (102). In raw format, the data in the data sources (102) is not synchronized (i.e., there are no clear relationships or is loosely synchronized. The identity resolution pipeline (112) clusters these records to group related records into a single entity (e.g., user) such a user's profile (from store 104), web or app session data (from store 106) and online and offline transaction data (from stores 108, 110) are combined into a single profile for a given user. Thus, the database (114) stores, for each unique user, the user's demographic data as well as historical order and session data associated with that user.

Figure 3:
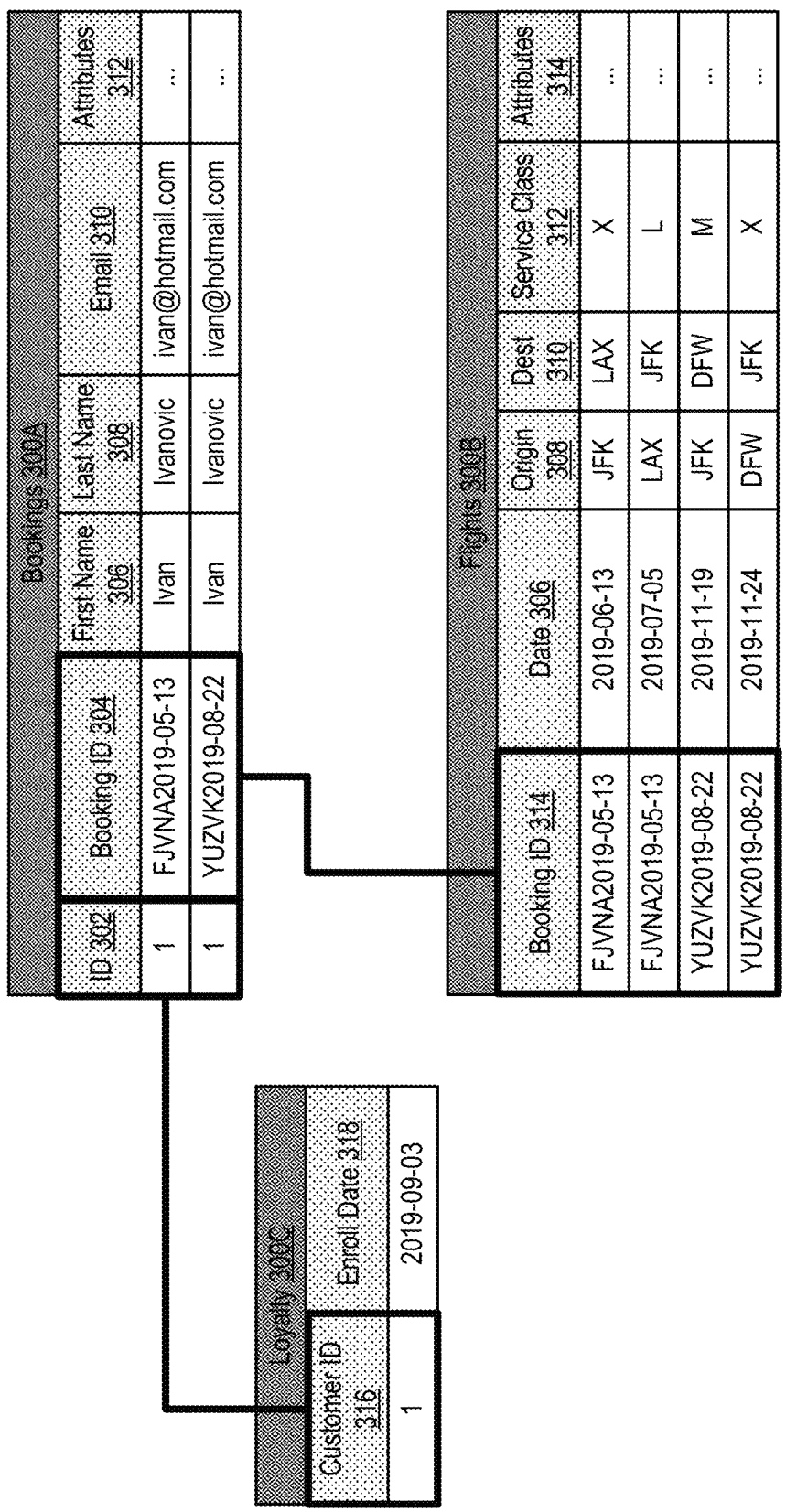
FIG. 3 is a block diagram illustrating a unified database schema of an airline according to some embodiments of the disclosure.

FIG. 3 is a block diagram illustrating a unified database schema of an airline according to some embodiments of the disclosure.

Figure 4:
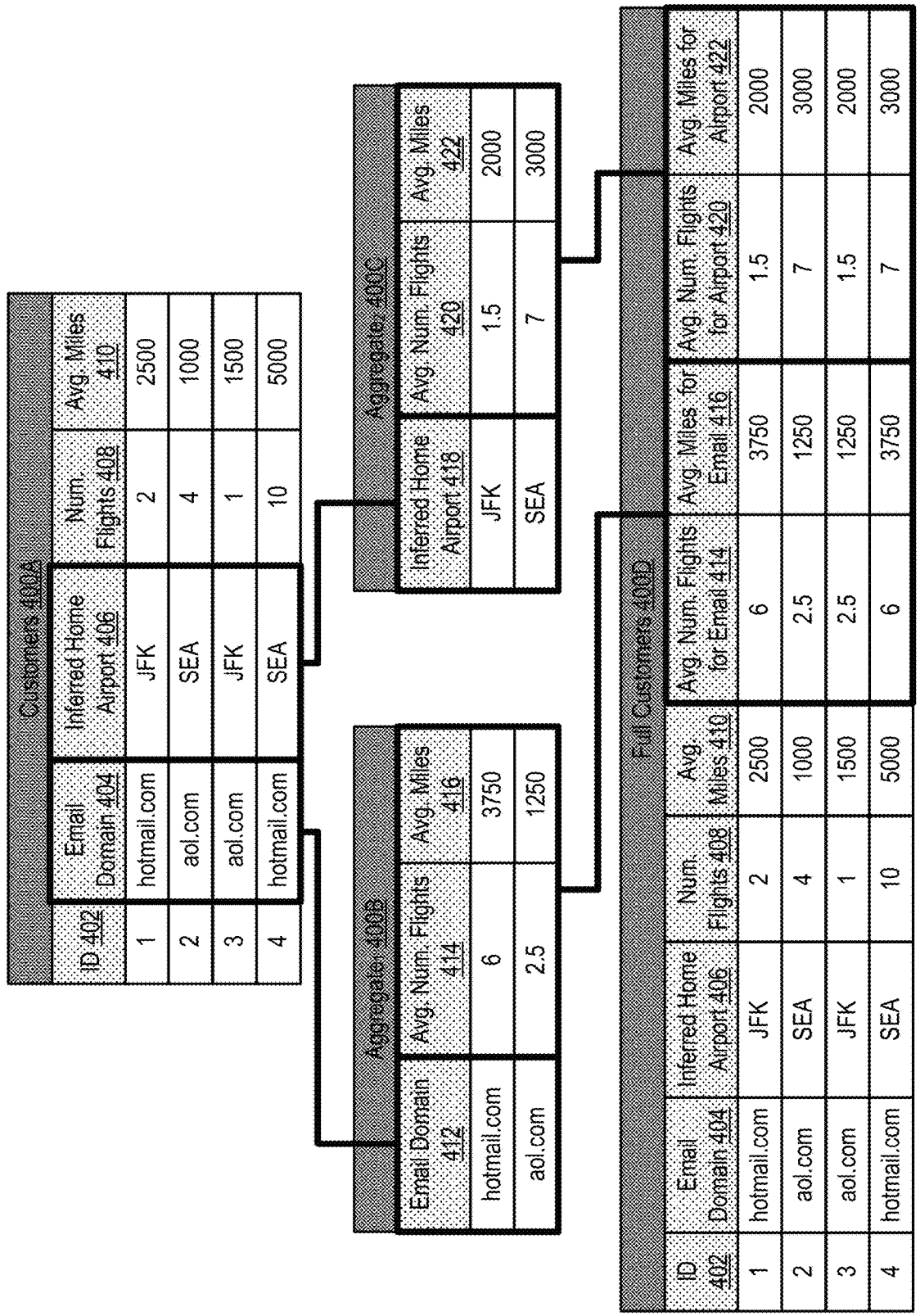
FIG. 4 is a block diagram illustrating lookup tables and feature vectors according to some embodiments of the disclosure.

The illustrated embodiment depicts a unified profile for a single user, "Ivan Ivanovic." Certainly, database (114) may include similar records for many other users, and the illustrated user may have more records than illustrated. In contrast to FIG. 2, the data depicted in FIGS. 3 and 4 provides an example of an airline that records data regarding customers (i.e., passengers).

In the illustrated embodiment, a bookings table (300a) stores data regarding each booking recorded in the raw data sources of the airline. In the illustrated embodiment, the table (300a) includes fields such as an identifier (ID) (302), booking ID (304), first name (306), last name (308), email (310), and any other attributes (312).

In the illustrated embodiment, the ID (302) is generated by the identity resolution pipeline (112) and uniquely identifiers a single user ("Ivan Ivanovic") regardless of whether the raw data includes duplicate records. Thus, returning briefly to FIG. 2, "S. Ride" and "Sally Ride" would both be associated with the same ID (302). In some embodiments, the identity resolution pipeline (112) may also harmonize the fields (306, 308, 310, 312) of the table to account for typos etc. in the raw data for a given user. In the illustrated embodiment, the airline data includes a flights table (300b) that stores data for given flights associated with the bookings in the bookings table (300a). In some embodiments, the flights table (300b) can be considered analogous to the products table (200c) of FIG. 2. In the illustrated embodiment, the flights table (300b) is linked to the bookings table via a booking ID field (314) which maps to the ID field (302) of the bookings table (300a). The flights table includes various details regarding specific flights associated with a booking, such as a date of the flight (306), an origin airport (308), a destination airport (310), a service class (312), and any other attributes (314). Finally, the unified airline data includes a loyalty table (300c) that stores details regarding a user's enrollment in a loyalty program. This table (300c) maps to the bookings table (300a) via a customer ID field (316) which maps to the ID field (302) of the bookings table (300a). The table (300c) additionally may include an enroll date field (318). In some embodiments, the table (300c) may also include any additional fields relevant to a loyalty program.

As will be described in connection with FIG. 4, the data in these tables (300a, 300b, 300c) may be analyzed to generate a lookup table of aggregated statistics and, ultimately, feature vectors using these aggregated statistics.

FIG. 4 is a block diagram illustrating lookup tables and feature vectors according to some embodiments of the disclosure.

In the illustrated embodiment, a customers table (400a) is derived from the tables in FIG. 3. The customers table (400a) includes a unique ID field (402), an email domain (404), an inferred home airport (406), a number of flights taken (408), and an average number of miles per flight (410). In the illustrated embodiment, the ID field (402) corresponds to the ID field (302) in FIG. 3. Thus, user 1 in FIG. 4 corresponds to user 1 ("Ivan Ivanovic") in FIG. 3, while users 2, 3, and 4 in FIG. 4 are not illustrated in FIG. 3.

In the illustrated embodiment, the email domain field (404) is generated by removing identifying information from the bookings table (300a) of FIG. 3. In some embodiments, the system will reduce field values to the minimum required information. Specifically, to perform aggregated statistics (described next), the system will generally remove uniquely identifying information on a sort key (e.g., email) such that a unique value such as an email address can be reduced to a value that can be aggregated. The variations that may be employed are not limited herein. As another example, a user's home address may be reduced to a city, city and state, county or some other higher-level value as relevant.

Similar to the above, after reducing the user's email address, a home airport field (406) is inferred. This is an example of synthesizing new fields from the existing data set. In the specific embodiment, the system determines that Ivan Ivanovic (user ID 1) frequently departs from JFK airport and thus infers this airport as his home airport. Users 2, 3, and 4 are associated with their own inferred home airports. A similar type of analysis could be done to determine a user's "favorite" store or "favorite" category of purchase.

As described, these two operations may be considered a generalization of a unique parameter (e.g., email address) and synthesizing or summarizing a set of values (e.g., home airport). These two operations may be done on any field of a dataset and can be used to generate aggregate statistics keys. In general, these keys will comprise categorical features, whereas the values for the keys will comprise numerical features. The keys will generally be selected a mid-range level of generality. For example, a user's full home address is not a useful key as only one user will be associated with it, while a user's continent will equally not be useful as too many users will be associated with it. The determination of a proper mid-range key may be tuned by the system operator during the model training and testing phase.

In addition to key fields (404, 406), the table (400a) includes statistical fields (408, 410). In general, a statistical field comprises an intermediate aggregation over a selected data type for a given user. As illustrated, the total number of flights for user 1 is summed and listed in field (408) while the average number of miles per flight for user 1 is computed and stored in field (410). The specific fields analyzed as statistical fields is not limiting and the specific operations to obtain the values is not limiting, however summations and averages are often used in these fields.

After generating the table (400a), two aggregate lookup tables (400b, 400c) are generated. In other embodiments, any number of lookup tables can be created based on the underlying table (400a). The first lookup table (400b) maps an email domain (412) to an average number of flights (414) and an average number of miles (416). The second lookup table (400c) maps a home airport (418) to the same statistics (420, 422). In some embodiments, the statistics mapped in the lookup tables (400b, 400c) may be different.

In the illustrated embodiment, the first look-up table (LUT) (400b) represents an aggregated feature that quantifies how many miles and lights a user with an email address in a given domain will take. The second LUT (400c) quantifies the average number of flights and length thereof users from specific airports take. While LUT (400c) may represent a clearly relevant feature (i.e., one may presume that users who fly out of major airports tend to take more trips), LUT (400b) may represent a less prominent feature (e.g., that users with an email address hosted by a specific provider take more flights than other providers). However, LUT (400b) may capture the fact that some email providers target users with more flight deals than other providers.

While only two LUTs (400b, 400c) are illustrated, the process generating the LUTs (400b, 400c) may be arbitrarily increased to any number of LUTs. This expansion drastically improves the speed in which new features can be explored and used to train and test the ML models (124, 126). For example, a system operator may determine that the use of LUT (400b) does not provide improved model prediction performance. In response, the operator can formulate a new feature (e.g., mapping of last names to average miles and flights) and test this feature to determine if model prediction performance is improved. Since the LUTs are generated based on aggregated statistics, the generation of LUTs is significantly faster than re-processing an entire training dataset. Indeed, without any indexing, customers table (400a) can be iterated through in O(n) time to generate a given LUT. However, in most scenarios, the table (400a) will include an index for each key (e.g., 404, 406), which improves performance to O(1) time. Thus, new features can be rapidly generated to test various permutations and improve model performance.

Returning to FIG. 3, a unified database (114) is used to provide testing and training data to an ML pipeline (120). In some embodiments, the division of testing and training data comprises a 70/30 split. That is, 70% of the data in the database (114) is used to train the models (122, 124), while 30% of the data is used to test the trained models.

In the illustrated embodiment, the training data set (122) is used to compute aggregate statistics by the aggregator (130). The aggregator (130) maintains a lookup table (LUT) (132) that is periodically updated according to the change on the training data. As illustrated, a feature generator (122) accesses the LUT (132) during feature vector generation, a process which will be described in more detail later herein. As used herein, an aggregate statistic refers to an aggregated column of the records in the database (114). Examples of aggregated statistics include the observed average purchase frequency based on zip codes and the probability of customers that purchase in the next forecasting interval given their previously purchased product IDs.

The use of aggregate statistics allows the operator to evaluate the impact of each categorical attribute's values (e.g., names, zip codes, and product categories) and assign each attribute with numerical feature values (e.g., probability of purchasing in the next quarter when the customer's given name is "Jennifer"). The separation of generating the attribute-based statistics from the ML models also allows for the update of these numerical feature values without retraining the ML models. In some embodiments, to prevent information leakage and contaminate the testing set, the attribute statistics are generated from the training set only, as illustrated.

As discussed, the training data (116) and the aggregated attribute statistics from the LUT (132) are received at the feature generator (122) to generate customer features during training and testing. In the illustrated embodiment, the same set of features to train the churn classifier (124) and the CLV regression model (126). In alternative embodiments, the aggregate statistics used for the models (124, 126) may differ based on tuning the system to surface the most relevant statistics. However, as illustrated, the use of the same statistics can aid in pruning irrelevant signals.

In the illustrated embodiment, the feature generator (122) generates feature vectors to be used in training and testing the models (124, 126). Various types of models may be implemented in the ML pipeline (120). The specific details of these models are described later herein, and that description is not repeated herein. As illustrated, after each of the models (124, 126) are trained using the feature vectors, data from the test set (118) is used to evaluate the performance of the models. Once the models are tuned, a client (128) can submit a new record to the ML pipeline (120) and receive a prediction based on the output of the models (124, 126). Details of these processes are provided in more detail herein.

Figure 5A:
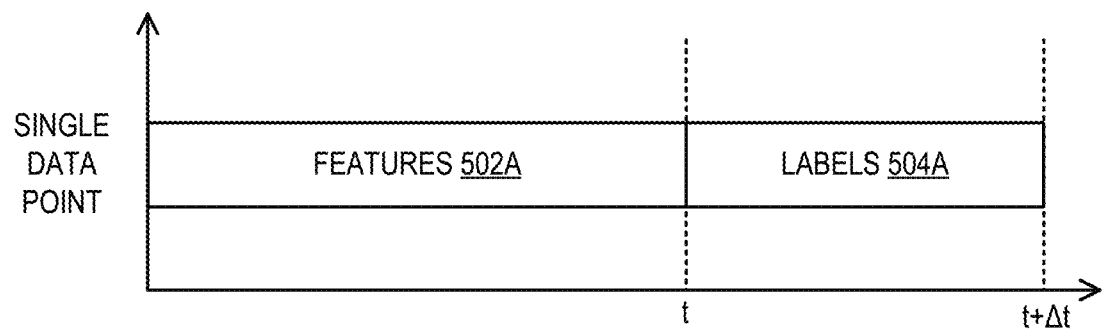
FIGS. 5A and 5B are a diagram illustrating two techniques for predicting future CLV or churn rates according to some embodiments of the disclosure.
Figure 5B:
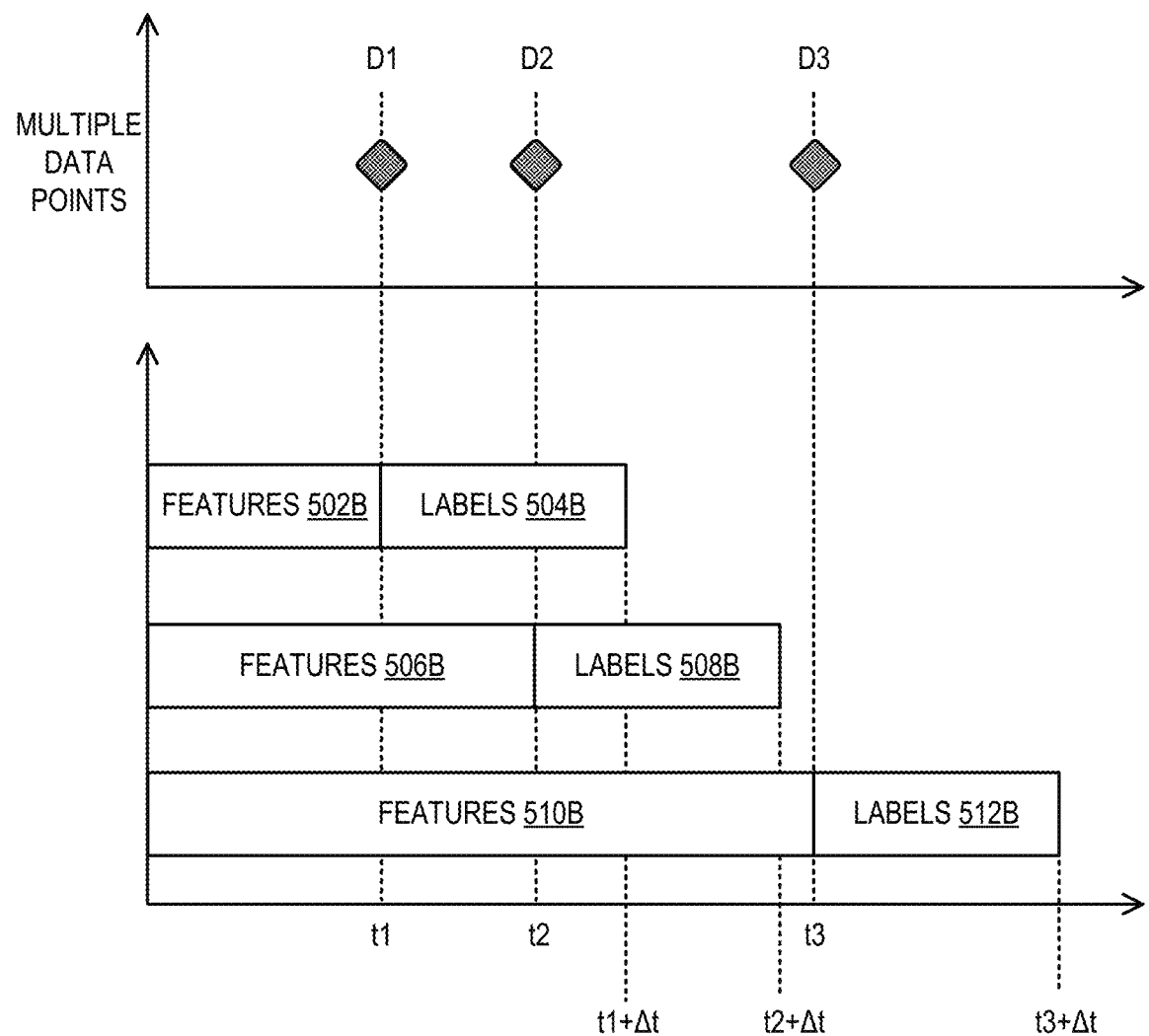

FIGS. 5A and 5B are a diagram illustrating two techniques for predicting future CLV or churn rates according to some embodiments of the disclosure. Additionally, FIGS. 5A and 5B illustrate boundaries between feature vector datasets and dataset portions used to generate labels (e.g., churn predictions, CLV).

FIG. 5A illustrates a classification method where a plurality of feature vectors (502a) before a time (t). After time (t), labels (504a) may be generated for a forecasting period (Δt). In both FIGS. 5A and 5B, the labels can be generated by analyzing data associated with a user during the forecasting period. For example, a CLV label can be calculated by summing all of the user's purchases in the forecasting period. Similarly, a churn prediction can be defined as a binary value indicating whether a user makes any purchases in the forecasting period. As a result, the combination of feature vectors (502a) and labels (504a) may be used as a training set of labeled feature vectors.

FIG. 5A illustrates a first, traditional technique for predicting CLV and churn rate. In this scenario, the starting date of a given prediction period is usually the same for all customers (i.e., a fixed-date mode). This fixed start data may be useful when the goal is to build scheduled marketing campaigns or to evaluate the business on a regular basis. However, to create a personalized experience and to add meaningful customer touch-points in time, being able to predict future purchase behavior right after each purchase event (i.e., post-purchase mode) is invaluable.

FIG. 5B illustrates a post-purchase mode for predicting future CLV or churn rates. As illustrated, training data can be generated at various points (D1, D2, D3) at times (t1, t2, t3). At each time point (t1, t2, t3), a growing set of feature vectors (502b, 506b, 510b) exist and labels (504b, 508b, 512b) can be generated for staggered prediction windows (Δt) beginning at time points (t1, t2, t3). To implement the post-purchase mode, the models (124, 126) implement two prediction settings: 1) a prediction mode (post-purchase or fixed-date, and (2) a prediction interval (Δt).

Thus, in the illustrated embodiment, both churn prediction and CLV prediction can be implemented as either fixed-date or post-purchase models. In the illustrated embodiment, to implement post-purchase mode, each model (124, 126) is fit for each forecasting horizon (Δt). For example, each model (124, 126) may be fit for the two most common prediction periods, long (52 weeks) and short (13 weeks). The results of experiments using these two prediction periods are provided in further detail herein.

Before discussing the methods (600, 700, 800), the existing techniques for predicting CLV or churn rate are described below and specific deficiencies solved by the methods (600, 700, 800) are identified.

Current solutions utilize an Extended Pareto/NBD model (EP/NBD) to predict CLV and churn rates. The EP/NBD model is a generative probabilistic model that generates the time-series of transaction time and order amounts. The model makes the following assumptions to first generate a sequence of purchase times:

The purchase count follows a Poisson distribution with the rate $\lambda$.

Lifetime distribution follows an exponential distribution with the slope $\mu$.

The latent parameters $\lambda$ and $\mu$ are constrained by two prior gamma distributions representing how these latent parameters are distributed among the population of customers.

The (non-extended) Pareto/NBD model only focuses on purchase counts and lifetimes, and it does not generate the monetary value of each purchase. Typically the Pareto/NBD model is coupled with a modeling choice for generating order values; the EP/NBD model utilizes the Gamma-Gamma extension to the Pareto/NBD model. The Gamma-Gamma component makes additional assumptions regarding the underlying data:

At the customer level, the transaction/order values vary randomly around each customer's average transaction value.

The observed mean value is an imperfect metric of the latent mean transaction value E(M), where M represents the monetary value.

The average transaction value varies across customers, though these values are stationary. This is a significant assumption and may not be valid in many business situations.

The distribution of average values across customers is independent of the transaction process. That is, monetary value can be modeled separately from the purchase count and lifetime components of the model. This may or may not hold in typical business situations.

The Pareto/NBD model computes the expected number of purchases in the next prediction interval for each customer, and the Gamma-Gamma model assigns a value to each of those future purchases. Together, the CLV for each customer in the next prediction interval can be predicted.

The EP/NBD provides reasonable performance if the underlying assumptions are true; however, it also has several disadvantages:

It is challenging to add arbitrary new features.

The assumptions of the generative model may hold in aggregate but are not flexible enough for individual customer behavior to differ.

Strong assumptions, such as stationary average transaction values over time may not hold for many businesses.

The model is weaker for customers who have a short transaction history, and is not applicable customers completely without transaction history.

Figure 7:
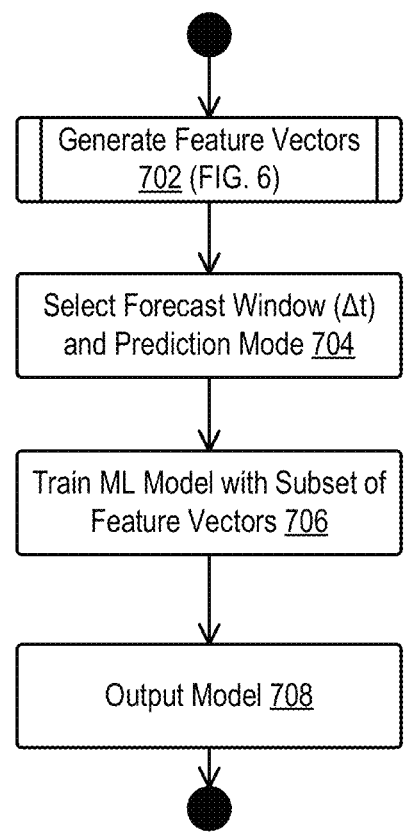
FIG. 7 is a flow diagram illustrating a method for training a predictive model according to some embodiments of the disclosure.
Figure 8:
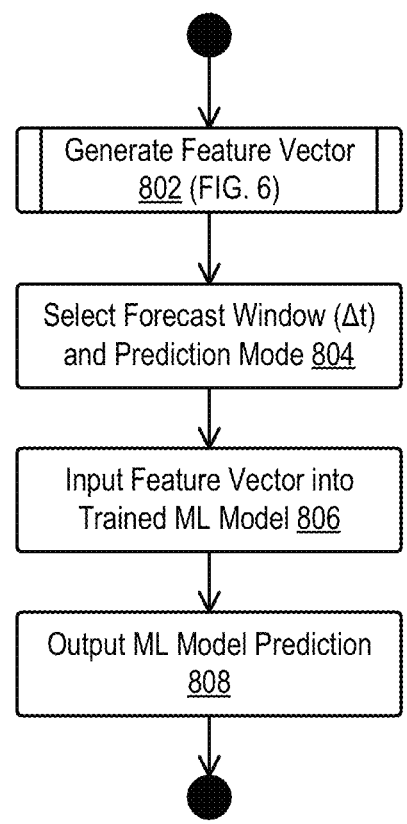
FIG. 8 is a flow diagram illustrating a method for predicting a churn rate or CLV according to some embodiments of the disclosure.

As will be described, the below methods (600, 700, 800) solve these and other deficiencies by providing a new technique for generating feature vectors (FIG. 6), using these feature vectors to train and test ML models (FIG. 7), and make predictions using these trained and tested models (FIG. 8).

Figure 6:
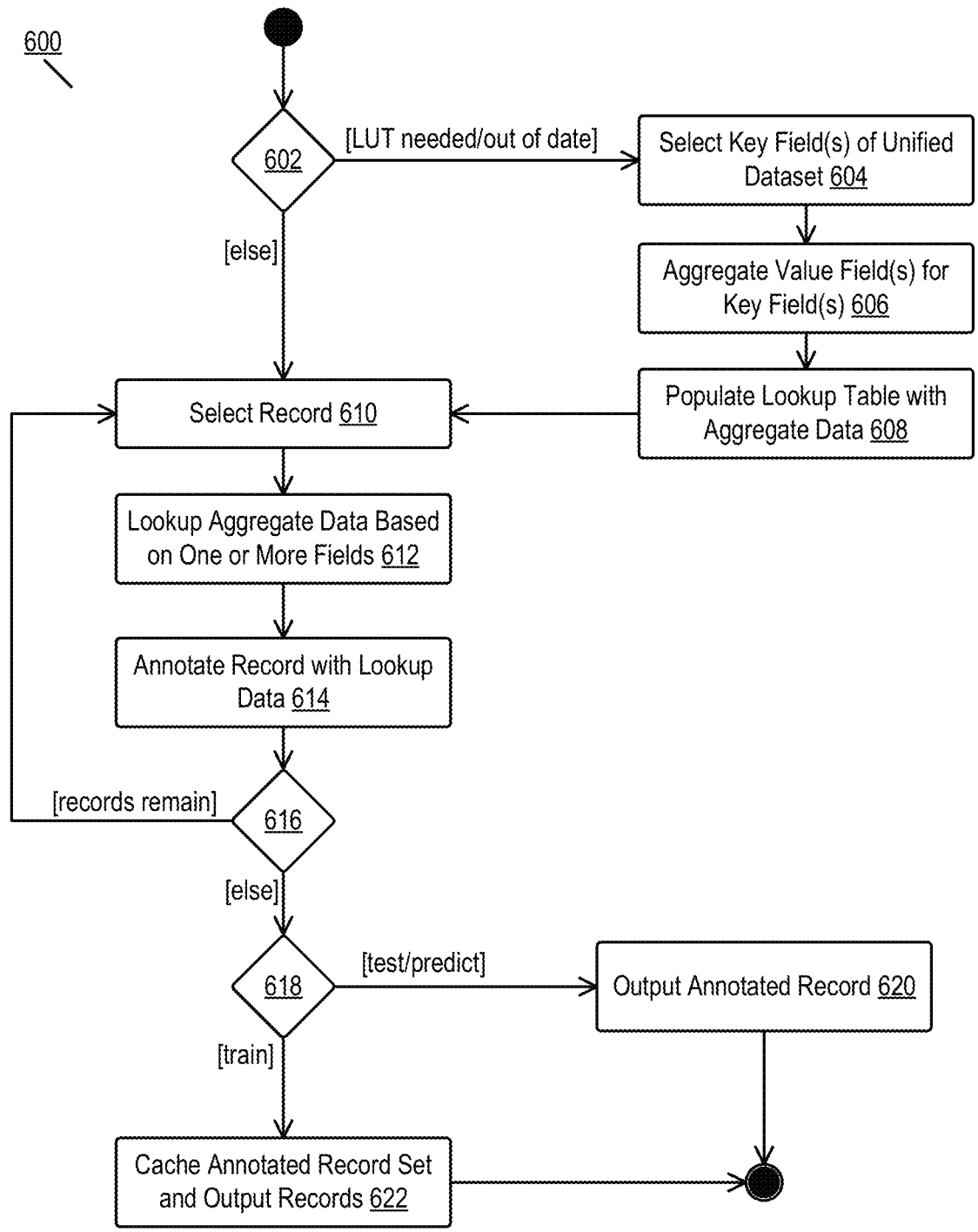
FIG. 6 is a flow diagram illustrating a method for generating feature vectors according to some embodiments of the disclosure.

FIG. 6 is a flow diagram illustrating a method for generating feature vectors according to some embodiments of the disclosure.

In the illustrated embodiment, the method (600) may be executed as part of the training, testing, or prediction process. Additionally, the method (600) may be executed offline as part of a lookup table generation process. These variations will be described as necessary in the following description.

In step 602, the method (600) determines if one or more LUTs are needed or out-of-date. In the former situation, the method (600) may be run for the first time. For the latter, the method (600) may determine the time elapsed since the LUTs were last updated. In some embodiments, a triggering threshold is used to determine when the LUTs should be recomputed. In another embodiment, the method (600) determines that the LUTs are out of date based on the size of the unified dataset. Specifically, if the size of the unified data set has increased significantly since the last update to the LUTs, the method (600) may refresh the LUTs. In some embodiments, the method (600) may determine if a change in size of the unified dataset (e.g., the number of records) exceeds a pre-configured size threshold. In both embodiments, the method (600) prevents constant refreshing of the LUTs which improves the performance of the system. In either scenario, the method (600) proceeds to step 604 if LUT creation/refresh is needed.

In step 604, the method (600) selects one or more key fields from a unified data set. As described in FIGS. 3 and 4, this key may comprise a lookup key that is used to group or aggregate unified records (e.g., email or inferred home airport). As indicated, in step 604, multiple such keys may be selected. In some embodiments, a combined key may be used. A combined key comprises multiple fields combined to form a key in the lookup table. For example, all combinations of email address domains and inferred home airports may be used.

In step 606, the method (600) aggregates value fields for the selected key fields. In the illustrated embodiment, the value fields comprise aggregated statistics for individual users. Thus, in step 606, the method (600) selects the key field and finds all users that match the key field. The method (600) then computes an aggregated statistic for all users matching the key field. Thus, if the key field is "email domain" and the aggregated statistic is "average miles flown" the method (600) finds all users matching the email domains then computes the average of an average miles flown field for each user. Reference is made to FIGS. 3 and 4 for further detail regarding step 606.

In step 608, the method (600) populates the LUTs with the aggregated data. In one embodiment, the LUTs are stored in a separate database and each LUT may be stored in a separate table. In some embodiments, this database may comprise a relational database, although key-value stores such as Redis may be used in place of a relational database. In some embodiments, the method (600) drops all content existing in the LUT database and replaces it with the new tables. In other embodiments, the method (600) updates the LUT database in place with the new contents computed in steps 604 and 606.

In the illustrated embodiment, steps 604 through 608 are configured to generate LUTs for a plurality of features. These features may be designed by the operator of the system as part of a feature exploration phase of an ML training procedure. Thus, in some embodiments, the decision in step 602 may be intentionally triggered to re-build the LUTs.

After step 608, the method (600) returns to step 610. Alternatively, if the method (600) determines that no LUT creation/refresh is needed, the method (600) proceeds from step 602 directly to step 610. Notably, in some embodiments, the method (600) may only execute steps 602 through 608. In this embodiment, the method (600) may only be executed to update LUTs and may not proceed to step 610. In this scenario, in step 602, the method (600) will end if it determines that no LUT update/creation is needed and will also end if step 608 is executed. As discussed in FIG. 1, in this scenario, steps 604 and 608 may be run on training data from a unified dataset.

In step 610, the method (600) selects a record. As will be apparent in the next steps, in some embodiments, only a single record is received by the method (600). This scenario arises when the method (600) is employed in the method depicted in FIG. 8, whereby a new record is being input into an ML model for prediction. Alternatively, when the method (600) is being employed for training or testing, the method (600) will receive multiple records to proceed in step 610.

In step 612, the method (600) looks up aggregate data based on one or more fields of the selected record. In the illustrated embodiment, the record selected in step 610 has the same format as the records in the unified dataset, or a similar format. As discussed, in step 604, the method (600) selects one or more fields to use a key in the LUTs. In step 612, the method (600) selects the same corresponding field (e.g., email) and uses that fields as a key to search the LUTs. In some embodiments, the method (600) may perform processing on the field to generate the lookup key. For example, if the LUT uses an email domain as a key, the method (600) may extract the domain from a full email address.

In step 614, the method (600) annotates the record with the LUT return value. In the illustrated embodiment, the method (600) will receive one or more aggregated statistics associated with the key utilized in step 612. The method (600) will add these statistics to the record to form a feature vector. In one embodiment, the feature vector follows a pre-configured schema and the method (600) annotates the record with the aggregated statistics based on this schema. Examples of this are described in FIG. 4.

In step 616, the method (600) determines if any records remain to be processed and, if so, executes steps 610 through 614 for each remaining record. As a result, after step 616, the method (600) obtains a set of one or more feature vectors that include the original record data and aggregated statistics.

In step 618, the method (600) determines whether one, or whether multiple, feature vectors were generated. Alternatively, the method (600) may determine whether the method (600) is executing in a training mode or testing/predicting mode. If testing or predicting, the method (600) generally outputs the single feature vector for input into an ML model. If in training mode, the method (600) may cache the feature vectors for later analysis before using the vectors to train the ML model. Details of training, testing, and prediction are described in the following figures.

FIG. 7 is a flow diagram illustrating a method for training a predictive model according to some embodiments of the disclosure.

In step 702, the method (700) generates feature vectors for a training set. In one embodiment, the method (700) accesses a unified dataset to retrieve unified records. The method (700) then splits the unified records and selects a fixed percentage of the records as a training set (e.g., 70% of the records). Then, in step 702 the method (700) annotates the unified records via the process described in FIG. 6

In step 704, the method (700) selects a forecast window ($\Delta t$) and a prediction mode (e.g., fixed-date or post-purchase). In some embodiments, step 704 is optional.

In step 706, the method (700) trains one or more ML models with the feature vectors in accordance with the forecast window and prediction mode (if applicable).

In one embodiment, the method (700) may first calculate labels for the identified feature vectors for the forecast window. As discussed above in connection with FIGS. 5A and 5B, labels may be generated by analyzing all data in a forecast window after a given time period for a given user and calculating the actual CLV or churn rate in this prediction window.

In one embodiment, a first ML model comprises a churn prediction model. In some embodiments, the first ML model can comprise any ML model capable of classifying an input. In one embodiment, the churn prediction model comprises a logistic regression model that predicts the binary event of whether a given customer will return over the next days (as defined by the forecast window) given past interactions and customer information. Alternatively, the first ML model may comprise a random forest model. Alternatively, or in conjunction with the foregoing, a second ML model can be trained to predict a CLV. In some embodiments, the second ML model can comprise any ML model capable of classifying an input. In one embodiment, the second ML model comprises a linear regression model that predicts total spend over a horizon defined by the forecast window and conditioned on customer information and past interactions. Alternatively, the second ML model may also comprise a random forest model. The specific types of models used in the disclosed embodiments are not intended to be limiting and other types of ML or similar models may be used based on the performance of the model or goals of the system.

In some embodiments, each of these models is trained for a single forecast window ($\Delta t$). Thus, multiple similar models can be trained for both the CLV and churn prediction models based on a variable number of forecast windows (e.g., monthly, quarterly, yearly). Given that the complexity of each model is relatively small, the use of multiple repetitive models does not introduce a significant computational burden.

Various approaches utilizing differing compositions of linear models are provided below.

Approach 1: Modeling CLV Directly Using a Linear Regression Model

In this approach, the CLV model is of the form:

$$CLV = w^T x + b,$$

where x is a feature vector and w and b are the feature coefficients and intercepts, respectively.

Approach 2: Model CLV Based on Combined Modeling

In this approach, the method (700) trains separate models to predict whether a customer returns in a time horizon (churn) and then conditioned on the return, predicts the CLV spend in the horizon using a linear regression model. This model can be represented as:

$$CLV = P(\text{return}?|x)(w^T x_{returned} + b),$$

where $P(\text{return}?|x)$ comprises the output of a logistic regression model predicting whether the customer churns in the forecasting horizon. In this approach, the CLV regression model is trained only on examples where the customer returns in the prediction horizon.

Approach 3: Empirical Conditioning

In this approach, rather than use a linear regression model to predict CLV as in Approach 2, instead, the method (700) predicts the number of transactions in the prediction horizon using a linear regression model, and then multiplies the output by an empirical average order value to estimate a CLV spend. As in Approach 2, in this approach, the method (700) utilizes a logistic regression model to predict the binary return event:

$$CLV = P(\text{return}?|x) \cdot \hat{v}_{returned} \hat{\zeta}_{returned},$$

where $\hat{v}_{returned}$ is the predicted purchase count (from a linear regression model) conditioned on return, and $\hat{\zeta}_{returned}$ is the historical average purchase value for the returned customer.

In one embodiment, prior to outputting the model, the method (700) will evaluate or test the model using unified data. In this embodiment, the method (700) will generate a feature vector for the test data using the process in FIG. 6. The method (700) will then insert the feature vector in the trained model to output a predicted CLV or churn rate. The method (700) will compare that prediction to the actual CLV or churn rate calculated as described above in FIGS. 5A and 5B based on existing data in a forecast window. The method (700) can summarize the accuracy of the model which can then be used to tune the model.

In step 708, the method (700) outputs the trained ML models for production usage. In some embodiments, the method (700) stores the trained ML parameters for use in an ML pipeline as described in FIG. 1 and not repeated herein.

FIG. 8 is a flow diagram illustrating a method for predicting a churn rate or CLV according to some embodiments of the disclosure.

In step 802, the method (800) generates a feature vector for a given record. In one embodiment, a client inputs a record containing a plurality of fields used to train the model, but notably excluding an aggregated statistic. In essence, the record comprises a "new" record to classify. In the illustrated embodiment, the method (800) executes the process in FIG. 6 to annotate the new record with aggregated statistics and that description is not repeated herein.

In step 804, the method (800) selects a forecast window ($\Delta t$) and a prediction mode (e.g., fixed-date or post-purchase). In some embodiments, step 804 is optional.

In step 806, the method (800) inputs the feature vector in the to one or more trained models. In this embodiment, the model(s) may comprise the models trained in Approaches 1, 2, or 3 as described in FIG. 7 and not repeated in detail herein. In one embodiment, step 806 comprises inputting the feature vector into a linear regression model. In one embodiment, step 806 comprises inputting the feature vector into a logistic regression model. In another embodiment, step 806 then multiplies the output of the logistic regression model by the output of the linear regression model. In some embodiments, the output of the linear regression model comprising a predicted customer lifetime value (CLV). In other embodiments, the output of step 806 comprises a predicted purchase count. In some embodiments, the method (800) multiplies the output of the logistic regression model by a historical average purchase value.

In step 808, the method (800) outputs the ML model prediction. In some embodiments, the method (800) outputs one or more of a CLV prediction or a churn rate, as described above. The accuracy of these predictions is described more fully in the following section which describes an ablation study and analysis of the outputs of the ML models.

Figure 9:
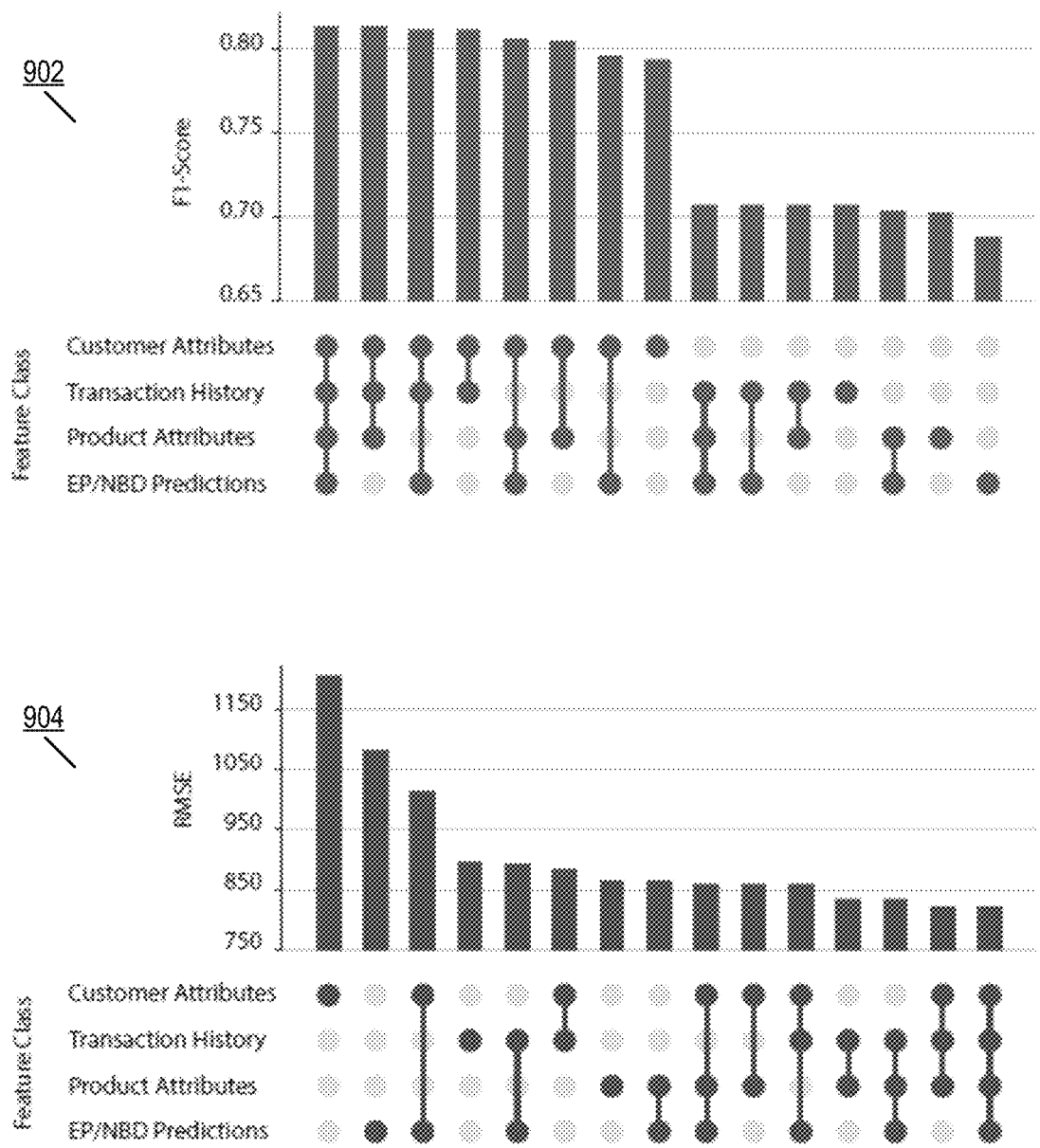
FIG. 9 is a diagram illustrating the results of a feature ablation study performed using the disclosed embodiments.

FIG. 9 is a diagram illustrating the results of a feature ablation study performed using the disclosed embodiments.

In the illustrated embodiment, a feature ablation study was performed on an organization's dataset with a forecast window ($\Delta t$) of 365 days and in fixed-data mode. That is, the study attempted to calculate CLV value for the next year after a fixed date in time. Every combination of the four feature groups described herein was evaluated against churn prediction F1 (higher is better) and CLV prediction RMSE (lower is better). As illustrated, a general lift in churn prediction stems from "Customer Attributes," indicating that unified customer data can help improve churn risk modeling.

With unified datasets, the models incorporated features across several kinds of customer information. There are four classes of features illustrated include:

Customer or Demographic Attributes: features for customer attributes using statistics about the behavior of customers with the attribute. For example, a feature for the average number of orders or cart total for customers from a given city. Similar feature variants exist for most discrete demographic attributes of a user; note that the statistics never utilize customer data in the test set so these statistics only reflect training customer historical data.

Transaction History: variants of RFM (recency, frequency, monetary) statistics (e.g., average order value) computed over various historical windows (last quarter, year, etc.). This may also include features like the month of the most recent transaction to capture seasonality information.

Product Attributes: Attributes about specific cart items when available, derived from looking at the "stickiness" of product purchases, defined by the likelihood of a return purchase within $\Delta t$ days after purchasing the item. This statistic is defined at the level of an individual product to define features for a customer based on the average stickiness of all past product purchases as well as the maximum stickiness.

EP/NBD Predictions: In order to understand if the EP/NBD captures any more information about the problem, the study also included adding traditional EP/NBD predictions (for frequency and average order value) as features to the models.

Each of the foregoing classes may be used to generate a LUT as described in the description of FIG. 6. In that Figure, the foregoing classes may be represented by data in discrete tables of data. In some embodiments, event data may also be used to generate LUTs. In this embodiment, data regarding individual events in a system are recorded, such as clickstream events. In some embodiments, this event data is stored in a log or similar file which can be processed using the techniques described in FIGS. 3 and 4 to generate aggregate statistics. The following examples further illustrate the multiple, discrete types of data that may be used to build a LUT.

In one embodiment, a demographic LUT is build by extracting a plurality of unique values for at least one demographic field. Examples of demographic fields comprise fields such as names, addresses, zip codes, etc. Various other demographic fields have been described before and that description is not repeated herein. After collecting all unique values for a demographic field, one or more aggregated statistic fields are aggregated for each value. An example of a demographic LUT is provided below in TABLE 1:

TABLE 1

| Name | Average Order Total for Next Year | Average Number of Orders for Next Year |
| --- | --- | --- |
| Jennifer | $1,500 | 30 |
| Mike | $300 | 5 |
| Nicole | $3,000 | 40 |

In TABLE 1, the demographic field chosen for the LUT is "Name" and three unique values were identified ("Jennifer", "Mike", and "Nicole"). Certainly, more than three values may be identified in actual operation. In some embodiments, the system may deduplicate values by identifying exact duplicates or near duplicates (e.g., typos, short-forms of values, etc.). In some embodiments, the field and value may comprise a complex or combined value. For example, instead of simply selecting a "Name" field, a "Name" and "State" field may be selected (for users in the United States). Thus, the values may comprise "Jennifer, WA", "Jennifer, NY", "Mike, CA", etc. The disclosed embodiments place no limit on the format or type of fields used in the LUT. After identifying the unique "Name" values, the system aggregates an average order total and an average number of orders. In the illustrated table, the system selects a given name ("Jennifer") and queries a unified data set to average the order total for each user named Jennifer. In the illustrated embodiment, this may comprise issuing a query for each user named "Jennifer" to average the value of an order total field. Similarly, the table averages the total number of orders for each user named Jennifer. As described above, generally any numerical feature may be used as an aggregated statistic and the disclosed embodiments do not limit the specific aggregated column.

Alternatively, or in conjunction with the foregoing, transaction history data can be used to generate fine-grained transaction LUTs that map transaction fields to aggregated statistics. Examples of transaction fields comprise fields such as product names, product identifiers, product price ranges etc. Various other transaction fields have been described before and that description is not repeated herein. After collecting all unique values for a transaction field, one or more aggregated statistic fields are aggregated for each value. An example of a transaction LUT is provided below in TABLE 2:

TABLE 2

| Last Product Purchased | Average Order Total for Next Year | Average Number of Orders for Next Year |
| --- | --- | --- |
| Croc-Effect Sandal | $2,500 | 20 |
| Trekking Sole Shoe | $1,00 | 15 |
| Platform Sneakers | $500 | 10 |

In TABLE 2, the transaction field chosen for the LUT is "Last Product Purchased" and three unique values were identified ("Croc-Effect Sandal", "Trekking Sole Shoe", and "Platform Sneakers"). Certainly, more than three values may be identified in actual operation. In some embodiments, the system may deduplicate values by identifying exact duplicates or near duplicates (e.g., typos, short-forms of values, etc.). As described above, combined or complex values may also be used. The disclosed embodiments place no limit on the format or type of fields used in the LUT. After identifying the unique "Last Product Purchased" values, the system aggregates an average order total and an average number of orders. In the illustrated table, the system selects a given product ("Croc-Effect Sandal") and queries a unified data set to average the order total for each transaction involving the product "Croc-Effect Sandal." In operation, the LUT may be used to annotate an input vector for a given transaction, to predict the CLV or churn rate based solely (or in part) on a new transaction.

Alternatively, or in conjunction with the foregoing, event data can be used to generate fine-grained transaction LUTs that map event fields to aggregated statistics. Examples of event fields comprise fields such as store identifier, uniform resource locators, etc. In general, any field in an event stream can be used as an event field. After collecting all unique values for an event field, one or more aggregated statistic fields are aggregated for each value. An example of a event LUT is provided below in TABLE 3:

TABLE 3

| Last Visited Store ID | Average Order Total for Next Year | Average Number of Orders for Next Year |
| --- | --- | --- |
| S123 | $2,500 | 20 |
| S124 | $1,00 | 15 |
| S125 | $500 | 10 |

In TABLE 3, the event field chosen for the LUT is "Last Visited Store ID" and three unique values were identified ("S123", "S124", and "S125"). Certainly, more than three values may be identified in actual operation. In some embodiments, the system may deduplicate values by identifying exact duplicates or near duplicates (e.g., typos, short-forms of values, etc.). As described above, combined or complex values may also be used. The disclosed embodiments place no limit on the format or type of fields used in the LUT. After identifying the unique "Last Visited Store ID" values, the system aggregates an average order total and an average number of orders. In the illustrated table, the system selects a given store ID ("S123") and queries a unified data set to average the order total for each event where the last store a user purchased an item was matches S123. In operation, the LUT may be used to annotate an input vector for a new event, to predict the CLV or churn rate based solely (or in part) on a new event. Notably, for event data, most embodiments will utilize a temporal key (e.g., last visited store identifier versus a fixed identifier such as a plain store identifier). For example, the price range of a last purchased product (e.g., 0-$10, $11-$50, etc.) may be used to surface trends based on most recent purchase amounts. Although described in the context of temporal fields, alternative embodiments may exist where static key fields may be used as key fields.

FIG. 9 shows the results of the study for a fixed-date yearly prediction. As illustrated, with all four feature classes incorporated, both the churn classification (902) and the CLV regression (904) perform the best (i.e., highest F1-score in the churn classification and lowest RMSE in the CLV regression).

Additionally, as illustrated, the EP/NBD prediction features add little marginal value with the other feature sets present, indicating that the information captured by this model is redundant with other feature classes. Notably, by using customer attributes alone, the disclosed embodiments can achieve predictions almost as accurate as when using all four feature classes, with the F1 score of 0.79 vs 0.82. This indicates that with rich customer attributes (mostly just demographic information) the models have the capability to predict churn without the need for any transaction history. This is significant because most statistical models, including the Pareto/NBD model, cannot make inferences on customers who have no past purchase history. Further, by only using only features generated from previously purchased products (e.g., the Product Attributes group above), the disclosed embodiments are able to predict the CLV almost as accurately as by using all feature classes, while in the traditional EP/NBD setting, this also couldn't be incorporated.

The following tables present results for both churn classification and CLV regression in four different prediction settings, parameterized by the prediction window ($\Delta t$) and the prediction mode (m), where $(\Delta t, m) \in \{(365$ days, post-purchase), (90 days, post-purchase), (365 days, fixed-date), (90 days, fixed-date)$\}$, using three different datasets (A, B, and C). As illustrated, compared to the baseline model, the models of the disclosed embodiments (labeled "AMP"), improve the F1 score in churn classification by 19.68% and 7.11% on average in fixed-date and post-purchase modes, respectively; and reduces the RMSE error in CLV regression by 20.76% and 9.61% in these two modes, respectively. The results in each table are obtained from the model with the highest training score.

Compared to the EP/NBD model, across all settings, the disclosed embodiments yield a meaningful F1-score lift in churn classification and RMSE reduction in CLV regression. Both models perform best when using a longer prediction interval and predicting from a fixed date. This may be caused by one or more of customers having enough time to establish a predictable purchase pattern when the prediction interval is long or using the customer's entire purchase history before a fixed date, which may contain multiple purchases, and therefore, the information contained in the features is richer.

Table 4, below, illustrates the churn prediction results of the disclosed embodiments ("AMP") in the fixed-date mod compared to a traditional EP/NBD prediction performed on three datasets (A, B, C):

TABLE 4

| Dataset | Quarterly (90 days) | | | Yearly (365 days) | | |
| --- | --- | --- | --- | --- | --- | --- |
| | EP/NBD | AMP | $\Delta F_1$ | EP/NBD | AMP | $\Delta F_1$ |
| A | 0.52 | 0.62 | +19.52% | 0.69 | 0.82 | +18.93% |
| B | 0.46 | 0.55 | +19.84% | 0.59 | 0.79 | +33.23% |
| C | 0.63 | 0.72 | +14.05% | 0.70 | 0.80 | +13.58% |
| Mean | 0.53 | 0.63 | +17.47% | 0.66 | 0.80 | +21.91% |

Table 5, below, illustrates the root mean square error (RMSE) of the disclosed embodiments ("AMP") for CLV prediction in a fixed-date mode:

TABLE 5

| Dataset | Quarterly (90 days) | | | Yearly (365 days) | | |
| --- | --- | --- | --- | --- | --- | --- |
| | EP/NBD | AMP | $\Delta$(RMSE) | EP/NBD | AMP | $\Delta$(RMSE) |
| A | 567.75 | 523.52 | −15.59% | 1101.55 | 808.85 | −26.32% |
| B | 87.10 | 82.72 | −5.03% | 209.51 | 175.73 | −16.12% |
| C | 226.43 | 197.59 | −12.78% | 597.72 | 306.12 | −48.79% |
| Mean | 293.76 | 267.91 | −11.13% | 636.26 | 430.23 | −30.40% |

Table 6, below, illustrates the churn prediction results of the disclosed embodiments ("AMP") for in post-purchase mode:

TABLE 6

| Dataset | Quarterly (90 days) | | | Yearly (365 days) | | |
| --- | --- | --- | --- | --- | --- | --- |
| | EP/NBD | AMP | $\Delta(F_1)$ | EP/NBD | AMP | $\Delta(F_1)$ |
| A | 0.51 | 0.57 | +11.7% | 0.67 | 0.76 | +13.4% |
| B | 0.44 | 0.46 | +3.39% | 0.58 | 0.64 | +11.7% |
| C | 0.75 | 0.76 | +1.33% | 0.88 | 0.89 | +1.12% |
| Mean | 0.56 | 0.60 | +5.47% | 0.71 | 0.76 | +8.75% |

Table 7, below, illustrates the root-mean squared error (RMSE) of the disclosed embodiments ("AMP") for CLV prediction in a post-purchase mode:

TABLE 7

| Dataset | Quarterly (90 days) | | | Yearly (365 days) | | |
| --- | --- | --- | --- | --- | --- | --- |
| | EP/NBD | AMP | $\Delta$(RMSE) | EP/NBD | AMP | $\Delta$(RMSE) |
| A | 437.53 | 384.64 | −13.75% | 1296.68 | 1140.27 | −12.06% |
| B | 95.13 | 82.89 | −9.85% | 286.52 | 250.01 | −12.74% |
| C | 231.77 | 220.78 | −4.74% | 555.86 | 530.68 | −4.53% |
| Mean | 254.81 | 229.44 | −9.44% | 713.02 | 652.48 | −9.77% |

Modern retail business collect more data from more channels than ever before, but traditional approaches to CLV and churn prediction only use a limited subset of data per customer, typically just the time-series of their transaction frequency and order values. The disclosed embodiments utilize a much more comprehensive customer dataset unified by a unified dataset. As discussed, the rich machine learning features derived from the unified customer dataset benefits predictive analytics modeling such as CLV and churn prediction. Empirically compared our model to a state-of-the-art baseline (Extended Pareto/NBD), the disclosed embodiments provide significant improvements in three different datasets and under various prediction settings. Specifically, the models achieved on average 13.4% F1 improvement in churn classification and 15.19% RMSE reduction in CLV prediction.

Figure 10:
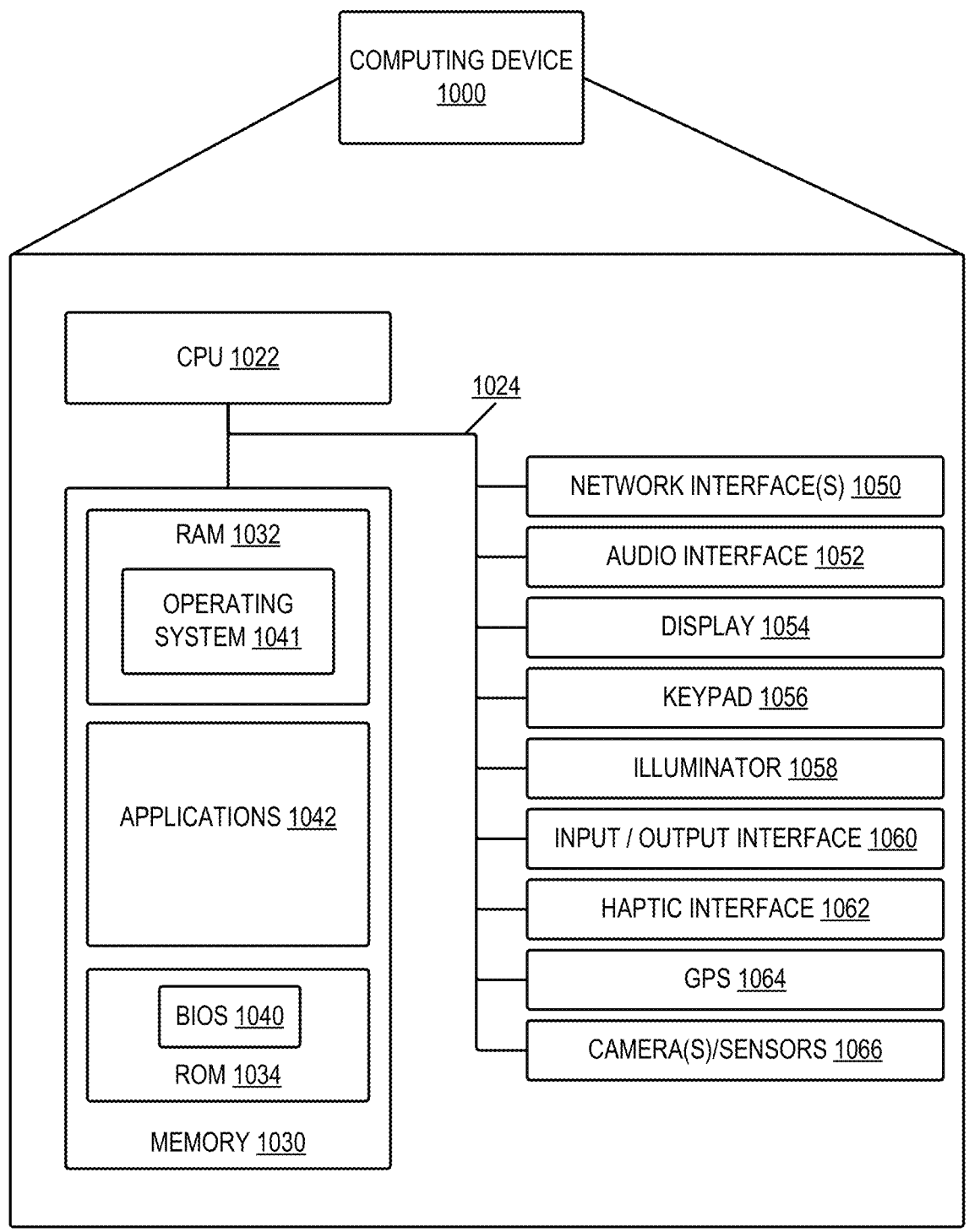
FIG. 10 is a schematic diagram illustrating a computing device showing an example embodiment of a client or server device that may be used within the present disclosure.

FIG. 10 is a schematic diagram illustrating a computing device showing an example embodiment of a client or server device that may be used within the present disclosure.

The computing device (1000) may include more or fewer components than those shown in FIG. 10. For example, a server computing device may not include audio interfaces, displays, keypads, illuminators, haptic interfaces, GPS receivers, cameras, or sensors.

As shown in the figure, the device (1000) includes a processing unit (CPU) (1022) in communication with a mass memory (1030) via a bus (1024). Computing device (1000) also includes one or more network interfaces (1050), an audio interface (1052), a display (1054), a keypad (1056), an illuminator (1058), an input/output interface (1060), a haptic interface (1062), an optional global positioning systems (GPS) receiver (1064) and a camera(s) or other optical, thermal, or electromagnetic sensors (1066). Device (1000) can include one camera/sensor (1066), or a plurality of cameras/sensors (1066), as understood by those of skill in the art. The positioning of the camera(s)/sensor(s) (1066) on the device (1000) can change per device (1000) model, per device (1000) capabilities, and the like, or some combination thereof.

The computing device (1000) may optionally communicate with a base station (not shown), or directly with another computing device. Network interface (1050) is sometimes known as a transceiver, transceiving device, or network interface card (NIC).

The audio interface (1052) is arranged to produce and receive audio signals such as the sound of a human voice. For example, the audio interface (1052) may be coupled to a speaker and microphone (not shown) to enable telecommunication with others and/or generate an audio acknowledgment for some action. Display (1054) may be a liquid crystal display (LCD), gas plasma, light emitting diode (LED), or any other type of display used with a computing device. Display (1054) may also include a touch-sensitive screen arranged to receive input from an object such as a stylus or a digit from a human hand.

Keypad (1056) may comprise any input device arranged to receive input from a user. Illuminator (1058) may provide a status indication and/or provide light.

The computing device (1000) also comprises input/output interface (1060) for communicating with external. Input/output interface (1060) can utilize one or more communication technologies, such as USB, infrared, Bluetooth™, or the like. The haptic interface (1062) is arranged to provide tactile feedback to a user of the client device.

Optional GPS transceiver (1064) can determine the physical coordinates of the computing device (1000) on the surface of the Earth, which typically outputs a location as latitude and longitude values. GPS transceiver (1064) can also employ other geo-positioning mechanisms, including, but not limited to, triangulation, assisted GPS (AGPS), E-OTD, CI, SAI, ETA, BSS, or the like, to further determine the physical location of the computing device (1000) on the surface of the Earth. In one embodiment, however, the computing device (1000) may through other components, provide other information that may be employed to determine a physical location of the device, including, for example, a MAC address, Internet Protocol (IP) address, or the like.

Mass memory (1030) includes a RAM (1032), a ROM (1034), and other storage means. Mass memory (1030) illustrates another example of computer storage media for storage of information such as computer-readable instructions, data structures, program modules or other data. Mass memory (1030) stores a basic input/output system ("BIOS") (1040) for controlling the low-level operation of the computing device (1000). The mass memory also stores an operating system (1041) for controlling the operation of the computing device (1000)

Applications (1042) may include computer-executable instructions which, when executed by the computing device (1000), perform any of the methods (or portions of the methods) described previously in the description of the preceding Figures. In some embodiments, the software and/or programs implementing the method embodiments can be read from hard disk drive (not illustrated) and temporarily stored in RAM (1032) by CPU (1022). CPU (1022) may then read the software and/or data from RAM (1032), process them, and store them to RAM (1032) again.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

For the purposes of this disclosure, the term "user," "subscriber," "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving a record, the record including a plurality of fields;
   selecting a value associated with a selected field in the plurality of fields;
   retrieving an aggregated statistic associated with the value from a lookup table, the lookup table comprising a data structure mapping values to aggregated statistics;
   combining the record with the aggregated statistic to create a feature vector;
   selecting a predictive model from a plurality of candidate predictive models by evaluating each of the candidate predictive models using varying prediction windows and prediction modes; and selecting a predictive model from the candidate predictive models that has the best performance for a selected prediction window and prediction mode;
   inputting the feature vector to the predictive model; and
   determining that the lookup table is out of date and updating the lookup table without retraining the predictive model.

2. The method of claim 1, wherein determining that the lookup table is out of date comprises determining if a change in size of a unified dataset storing the aggregated statistics exceeds a pre-configured size threshold.

3. The method of claim 1, wherein the lookup table is generated using one or more fields of demographic data as a key field, the demographic data comprising data describing users.

4. The method of claim 1, wherein the lookup table is generated using one or more fields of transaction data as a key field, the transaction data comprising a listing of historical transactions.

5. The method of claim 1, wherein the lookup table is generated using one or more fields of event data as a key field, the event data comprising real or near-real time data recorded by a computing system.

6. The method of claim 1, the inputting the feature vector to the predictive model further comprising setting one or more of a prediction window and prediction mode.

7. A non-transitory computer-readable storage medium for tangibly storing computer program instructions capable of being executed by a computer processor, the computer program instructions defining the steps of:
   receiving a record, the record including a plurality of fields;
   selecting a value associated with a selected field in the plurality of fields;
   retrieving an aggregated statistic associated with the value from a lookup table, the lookup table comprising a data structure mapping values to aggregated statistics;
   generating a feature vector by annotating the record with the aggregated statistic;
   selecting a predictive model from a plurality of candidate predictive models by evaluating each of the candidate predictive models using varying prediction windows and prediction modes; and selecting a predictive model from the candidate predictive models that has the best performance for a selected prediction window and prediction mode;
   inputting the feature vector to a predictive model; and
   determining that the lookup table is out of date and updating the lookup table without retraining the predictive model.

8. The computer-readable storage medium of claim 7, wherein determining that the lookup table is out of date comprises determining if a change in size of a unified dataset storing the aggregated statistics exceeds a pre-configured size threshold.

9. The computer-readable storage medium of claim 7, wherein the lookup table is generated using one or more fields of demographic data as a key field, the demographic data comprising data describing users.

10. The computer-readable storage medium of claim 7, wherein the lookup table is generated using one or more fields of transaction data as a key field, the transaction data comprising a listing of historical transactions.

11. The computer-readable storage medium of claim 7, wherein the lookup table is generated using one or more fields of event data as a key field, the event data comprising real or near-real time data recorded by a computing system.

12. The computer-readable storage medium of claim 7, the inputting the feature vector to the predictive model further comprising setting one or more of a prediction window and prediction mode.

13. An apparatus comprising:
    a processor; and
    a storage medium for tangibly storing thereon program logic for execution by the processor, the stored program logic causing the processor to perform the operations of:
    receiving a record, the record including a plurality of fields;
    selecting a value associated with a selected field in the plurality of fields;
    retrieving an aggregated statistic associated with the value from a lookup table, the lookup table comprising a data structure mapping values to aggregated statistics;
    generating a feature vector by annotating the record with the aggregated statistic;
    selecting a predictive model from a plurality of candidate predictive models by evaluating each of the candidate predictive models using varying prediction windows and prediction modes; and selecting a predictive model from the candidate predictive models that has the best performance for a selected prediction window and prediction mode;
    inputting the feature vector to a predictive model; and
    determining that the lookup table is out of date and updating the lookup table without retraining the predictive model.

14. The apparatus of claim 13, the inputting the feature vector to the predictive model further comprising setting one or more of a prediction window and prediction mode.

15. The apparatus of claim 13, wherein determining that the lookup table is out of date comprises determining if a change in size of a unified dataset storing the aggregated statistics exceeds a pre-configured size threshold.

16. The apparatus of claim 13, wherein the lookup table is generated using one or more fields of demographic data as a key field, the demographic data comprising data describing users.

17. The apparatus of claim 13, wherein the lookup table is generated using one or more fields of transaction data as a key field, the transaction data comprising a listing of historical transactions.

18. The apparatus of claim 13, wherein the lookup table is generated using one or more fields of event data as a key field, the event data comprising real or near-real time data recorded by a computing system.

\* \* \* \* \*